(12) United States Patent
Baumann et al.

(10) Patent No.: US 6,925,104 B2
(45) Date of Patent: Aug. 2, 2005

(54) CARBON ELECTRODES AND CONNECTION ELEMENTS OF THE ELECTRODES HAVING DIRECTIONALLY STRUCTURED CONTACT SURFACES

(75) Inventors: Stefan Baumann, Augsburg (DE); Karl Wimmer, Nordendorf (DE)

(73) Assignee: SGL Carbon AG, Wiesbaden (DE)

( * ) Notice: Subject to any disclaimer, the term of this patent is extended or adjusted under 35 U.S.C. 154(b) by 0 days.

(21) Appl. No.: 10/765,600

(22) Filed: Jan. 26, 2004

(65) Prior Publication Data

US 2004/0192088 A1 Sep. 30, 2004

(30) Foreign Application Priority Data

Jan. 24, 2003  (DE) .......................................... 103 02 956

(51) Int. Cl.[7] ................................................. H05B 7/14
(52) U.S. Cl. ............................ 373/92; 373/91; 403/292
(58) Field of Search .............................. 373/82, 88–92; 403/DIG. 5, 292, 296, 298, 299, 320; 439/87, 427, 429, 784, 889, 894

(56) References Cited

U.S. PATENT DOCUMENTS

| | | | |
|---|---|---|---|
| 2,135,637 A | | 11/1938 | Gade |
| 2,527,294 A | | 10/1950 | Bailey |
| 2,867,786 A | | 1/1959 | Doetsch et al. |
| 2,957,716 A | * | 10/1960 | Kaufmann et al. ............ 373/92 |
| 3,134,616 A | * | 5/1964 | Kaufmann .................. 403/296 |
| 4,152,533 A | * | 5/1979 | Gazda ......................... 373/91 |
| 4,273,175 A | | 6/1981 | Capuano |
| 4,375,340 A | * | 3/1983 | Faircloth, Jr. ................. 373/91 |
| 4,679,206 A | * | 7/1987 | Burwell ....................... 373/91 |
| 4,729,689 A | | 3/1988 | Nazem et al. |
| 5,190,423 A | | 3/1993 | Ewing |
| 5,314,279 A | | 5/1994 | Ewing |
| 5,336,015 A | * | 8/1994 | Stewart et al. ................ 373/91 |
| 6,500,022 B2 | * | 12/2002 | Varela ........................ 439/429 |
| 6,829,287 B2 | * | 12/2004 | Baumann et al. ............. 373/92 |

FOREIGN PATENT DOCUMENTS

| | | |
|---|---|---|
| DE | 34 42 316 A1 | 5/1986 |
| DE | 41 37 020 A1 | 5/1993 |
| EP | 0 056 127 A2 | 7/1982 |
| WO | 92/14939 | 9/1992 |

OTHER PUBLICATIONS

Author not listed: "Carbon and Graphite Artifacts", Ullmann's Encyclopedia Of Industrial Chemistry, VCH Verlagsgesellschaft mbH, Weinheim, vol. A5, 1986, pp. 103–113.

Lancaster, J. K.: "Transitions in the Friction and Wear of Carbons and Graphites Sliding Against Themselves", ASLE Transactions, vol. 18, 3, pp. 187–201.

\* cited by examiner

*Primary Examiner*—Tu Hoang
(74) *Attorney, Agent, or Firm*—Laurence A. Greenberg; Werner H. Stemer; Ralph E. Locher (57) ABSTRACT

Electrode columns made from carbon and graphite are screwed together from individual elements, for example, the electrodes and nipples. The elements have directionally structured contact surfaces. Such a structure of the contact surfaces gives rise to the elements of a column demonstrating increased resistance to loosening after intensive machine screwing or screwing applied by hand, which, therefore, is often inadequate, whereby a higher level of operational reliability is achieved, in particular, in the case of electrode columns that are screwed together by hand.

32 Claims, 5 Drawing Sheets

CARBON ELECTRODES AND CONNECTION ELEMENTS OF THE ELECTRODES HAVING DIRECTIONALLY STRUCTURED CONTACT SURFACES

BACKGROUND OF THE INVENTION

Field of the Invention

The invention relates to elements of an electrode column that are of carbon electrodes having sockets and internal threads on their faces and of carbon nipples connecting in each case two such electrodes or that are of carbon electrodes having a socket with an internal thread on one face and having an integrated nipple on the other face. The electrodes are provided for an electrode column for use in an arc furnace for the production of high-melting-point metals. The elements have ideally formed contact surfaces with directionally structured scale-like elevations protruding therefrom.

The production of carbonized or graphitized carbon bodies is a technique that has been mastered up to now for over one hundred years and is applied on a large scale industrially and has, therefore, been refined in many respects and optimized with regard to costs. One of the descriptions of this technique can be found in ULLMANN'S ENCYCLOPEDIA OF INDUSTRIAL CHEMISTRY, Vol. A5, published by VCH Verlagsgesellschaft mbH, Weinheim, 1986, pages 103 to 113.

The utility of the electrodes, nipples, and electrode columns made from carbon in arc furnaces depends upon the properties attained during production, in particular, as well the surface properties. These surface properties depend, for example, upon the type of material (degree of graphitization), pore content, grain size, and the type of processing determining the surface roughness. The aforementioned factors determine the coefficients of friction that are important when joining two bodies—for example, an electrode and a nipple or two electrodes—and when sliding two surfaces over each other.

An arc furnace contains at least one column of carbon electrodes. Such a column is held at the upper end by a supporting arm, by way of which the electric current also reaches the electrode column. During operation of the furnace, the arc passes from the lower tip of the column into the melting stock located in the furnace. As a result of the arc and the high temperatures in the furnace, the electrode column slowly burns away at its lower end. Compensation is made for the shortening of the electrode column by subsequently pushing the column on into the furnace bit by bit and, if necessary, screwing an additional electrode onto the upper end of the column. If necessary, a column that has been partly burnt away will be removed as a unit from the supporting arm and replaced by a fresh column of sufficient length.

Screwing individual carbon electrodes onto a column located in the furnace or screwing electrodes together to form a fresh column is carried out by hand or by a mechanical device. In particular, in the case of electrodes that are of a large diameter of 600 mm or more, considerable forces and torques need to be applied or considerable screwing operations need to be effected to ensure that an electrode column keeps together. The unity of a column is crucial for the function of an arc furnace.

The unity of a column is put at risk during transportation, yet is mostly put at risk during the operation of a furnace. During the operation of a furnace, considerable bending torques repeatedly result on the electrode column on account of the swing of the furnace vessel including the column, or, as the case may be, the electrode column is subject to persistent vibration; even knocks on the column caused by the charge stock strain the unity of the column. All types of strain—repeated bending torques, vibrations, and knocks—can give rise to a loosening of the screwed connection of electrodes. A loosening is to be considered to be the result of unavoidable and/or undesirable processes.

The term "loosening torque" is presented for the purpose of characterizing the unity of a column of carbon electrodes with a variable in terms of measurement techniques. The loosening torque for unscrewing an electrode connection is determined by a measuring apparatus. Below the range of mechanical damage of the thread concerned, loosening of a screwed connection is more unlikely and the operation with the electrode column is more reliable when the loosening torque of a connection of two elements of an electrode column is higher.

For the purpose of understanding this concept, the consequences of a loosening of the screwed connections of an electrode column during the operation of a furnace are outlined in the following text.

During loosening, it is assumed that the bracing of the screwed connection is reduced. Thus the contact pressure forces of the contact surfaces of adjacent column elements also decrease. The loosening can progress to such an extent that some of the contact surfaces separate from each other.

Consequently, the electrical resistance in the connection increases. The surfaces that have remained in contact are loaded with an increased current density. The increased current density results in local, thermal overheating.

During the loosening of a screwed connection, the nipple is subject to great thermal and mechanical loading as a rule. Ultimately, overheating and mechanical loading can lead to mechanical failure of the nipple. Consequently, the tip of the electrode column falls off and plunges into the steel smelt, the arc breaks off, and the smelting process is terminated.

Very different considerations have been given to countering the problems of insufficient unity and insufficient current transfer from one portion of an electrode column to the next, and the practice that is outlined below is applied.

The friction conditions between carbon bodies, chiefly at different rates of friction, are investigated in an article by J. K. LANCASTER "Transitions in the Friction and Wear of Carbons and Graphites Sliding Against Themselves" from ASLE TRANSACTIONS, Vol. 18, 3, pages 187 to 201. No teaching can be inferred from this publication as to how two carbon bodies can be screwed together as firmly as possible, leaving aside the general understanding that at very low relative speeds of the two carbon bodies low coefficients of friction are observed, see FIGS. 1, 2 and 6. This understanding points more to stationary carbon bodies sliding off from each other slightly.

In other specialist fields, attempts have also been made to solve the problem pertaining to the loosening of fastening elements. Self-securing fastening elements, such as, for example, screws and nuts made from materials that are not described, are described in German Published, Non-Prosecuted Patent Application DE 41 37 020. The element has a number of bump-like projections in the end face that cooperates with a component. The projections are formed as pyramids or cones with a height of less than 1 mm, with the angle at the pyramid point or cone point amounting to at least 90°. The pyramids or cones are to be pressed, during the screwing action, into the surfaces of the components that are to be braced and, thus, prevent the fastening elements from turning back. In German Application DE 41 37 020 at column 2, line 9, reference is made to the "placement" and the reduction in the pre-tension connected therewith. The pyramids or cones are evenly distributed over the end face of the fastening element. The fastening element does not have a directionally structured contact surface and, thus, has no preferred direction with a special effect.

In relation to the screwing together of columns of carbon electrodes, reference may be made to the fact that macroscopic bumps on the contact surfaces of the electrodes or nipples would split away during the screwing action on account of the ceramic and, thus, brittle character of the carbon materials.

Sizeable pieces might even possibly break off from the end faces of the column elements.

Asymmetrical bumps in the contact surfaces of special fastening elements are described in International Application WO 92/14939, corresponding to U.S. Pat. Nos. 5,190,423 and 5,314,279 to Ewing. With this preferred direction, a limited number of "macroscopic" bumps that are distributed over the periphery prevent the unintentional loosening of the two- or three-part screwed connection that is described. A feature of such screwed connections that is not unimportant is the coefficient of friction that is lower between the shallow rises of two opposing bumps of two fastening elements than that between the steep rises of two opposing bumps. A sliding layer that is applied to the shallow rises contributes to the friction. A considerable outlay is, therefore, required to produce these fastening elements to prevent the unintentional loosening of screwed connections.

In relation to the screwing together of columns of carbon electrodes, reference may be made to the fact that macroscopic bumps on the contact surfaces of the electrodes or nipples would split away during the screwing action on account of the ceramic and, thus, brittle character of the carbon materials. Sizeable pieces might even possibly break off from the end faces of the column elements.

A bi-conical nipple with a threadless central portion is described in German Published, Non-Prosecuted Patent Application DE 34 42 316 A1; graphite electrodes are screwed together with such a nipple. There is an expansion gap that is filled with a compressible substance provided between the central portion of the nipple and the sockets of the carbon electrodes.

This principle is, in the first place, to reduce the (tangential) peak stresses in the electrode socket and prevent electrode breakages, as a result, it differs completely from the principle in accordance with the invention of diminishing the loosening of carbon electrodes that are screwed together.

Carbon electrodes and/or nipples whose thermal-shock resistance and impact resistance are improved by introducing longitudinal slits into these elements are described in U.S. Pat. No. 2,527,294 to Bailey. This principle, in a similar way to that in accordance with the specification of German Published, Non-Prosecuted Patent Application DE 34 42 316 A1, is to reduce (tangential) peak stresses in the electrode socket and prevent electrode breakages. Therefore, it also differs completely from the principle, in accordance with the present invention, of diminishing the loosening of carbon electrodes that are screwed together.

In steel-works practice, attempts are made to screw the electrodes together as firmly as possible. As mentioned above, the forces, torques, and screwing operations that can be realized by hand are limited. These variables can be considerably increased by mechanical devices, although operations are only carried out with such mechanical screwing devices in one section of the steel works. The steelworks practice shows that, time and time again, instances of loosening in the electrode columns occur.

SUMMARY OF THE INVENTION

It is accordingly an object of the invention to provide carbon electrodes and their connection elements having directionally structured contact surfaces that overcome the hereinafore-mentioned disadvantages of the heretofore-known devices of this general type and that constructs the points of connection of a column of carbon electrodes such that no loosening of the individual elements of the column from each other ensues or that there is a high level of security of the unity of a column and that increases the measurable loosening torque between adjacent elements of an electrode column.

With the foregoing and other objects in view, there is provided, in accordance with the invention, an electrode column for use in an arc furnace for the production of high-melting-point metals, including carbon electrodes having end faces and sockets having internal threads, the sockets being disposed at the end faces, carbon nipples connecting two respective ones of the electrodes at the sockets, the carbon electrodes and the carbon nipples having ideally formed contact surfaces with directionally structured, scale-shaped elevations protruding therefrom over a height range between approximately three micrometers and approximately one hundred micrometers, and adjacent ones of the contact surfaces of a screwed together connection of the electrodes having a contact pressure in a range between approximately 0.1 N/mm$^2$ and approximately 80 N/mm$^2$.

With the objects of the invention in view, there is also provided an electrode column for use in an arc furnace for the production of high-melting-point metals, including carbon electrodes each having end faces, a socket with an internal thread on one of the end faces, and an integrated nipple on another of the end faces, the carbon electrodes having ideally formed contact surfaces with directionally structured, scale-shaped elevations protruding therefrom over a height range between approximately three micrometers and approximately one hundred micrometers, and adjacent ones of the contact surfaces of a screwed together connection of the electrodes having a contact pressure in a range between approximately 0.1 N/mm$^2$ and approximately 80 N/mm$^2$.

According to the present invention, the carbon electrode and/or a carbon nipple connecting in each case two electrodes have/has on contact surfaces for the next element of the electrode column a surface structure whose directionally structured, scale-like elevations protrude over the ideally formed contact surface over a height range of three to a hundred micrometers, and the adjacent contact surfaces of a screwed connection have a contact pressure in the range of 0.1 to 80 N/mm$^2$.

In accordance with another feature of the invention, the ideally formed contact surfaces are one of planar and curved.

In accordance with a further feature of the invention, the carbon electrodes and/or carbon nipples are of a material and the elevations on the directionally structured contact surfaces are of the material.

In accordance with an added feature of the invention, the screwed connection has a fastening direction and an loosening direction opposite the fastening direction, the elevations have a substantially asymmetrical shape with flanks having a flank rise of differing steepness, and the flanks have a substantially shallow rise in the fastening direction and have a substantially steep rise in the loosening direction.

In accordance with an additional feature of the invention, the column electrodes are substantially cylindrical with a longitudinal axis and the elevations have a greatest height formed as one of a point and a substantially radially orientated comb relative to the longitudinal axis.

In accordance with yet another feature of the invention, the column electrodes are substantially cylindrical with a longitudinal axis and the elevations have, relative to the longitudinal axis, a greatest height formed as one of a point and a substantially radially orientated comb.

In accordance with yet a further feature of the invention, each the shallow rise of all the elevations is disposed in the fastening direction in the contact surfaces.

In accordance with yet an added feature of the invention, the elevations are statistically distributed over a respective contact surface.

According to the present invention, the similar tangential directions—either the fastening or loosening direction of the screwed connection—of the directionally structured contact surfaces of two adjacent elements of an electrode column are respectively aligned in opposite directions.

In accordance with again a further feature of the invention, the screwed connection has a fastening direction and an loosening direction opposite the fastening direction, the carbon electrodes and the carbon nipples are elements of an electrode column, and similar tangential directions selected from at least one of the group consisting of the fastening direction and the loosening direction of the directionally structured contact surfaces of two adjacent ones of the elements are respectively aligned in opposite directions.

In accordance with again an added feature of the invention, one of the carbon electrodes and one of the carbon nipples are combined to form a preset with inner contact surfaces, the electrode socket and the nipple have threaded surfaces, and the inner contact surfaces of the preset are directionally structured and include the threaded surfaces of the electrode socket and of the nipple.

In accordance with a concomitant feature of the invention, the end faces, the sockets and the nipples have the contact surfaces with the elevations.

The disadvantages of the prior art are precisely precluded by the invention presented herewith.

An important advantage of the present invention lies in the small dimensions of the asymmetrical bumps or scales on the contact surfaces. Small scales, in the case of deformations during the screwing process, do not give rise to spalling on the ceramic bodies of the electrodes or nipples made from carbon or graphite.

Another advantage lies in the fact that it is not necessary to apply a sliding layer to the bumps/scales or to the contact surfaces.

A further advantage lies in the fact that usual contact pressures of adjacent elements in the electrode columns suffice to impede any loosening. In the case of the usual contact pressures, the oppositely aligned scale-like elevations of adjacent elements in the column become hooked up.

The terms in the text that follows are to be understood as set forth in the following text.

The ends of an electrode are also referred to as the face.

An electrode has a cylindrical lateral surface and on both sides a respective end face disposed perpendicularly in relation to the electrode axis.

A socket is a coaxially disposed recess in the face of an electrode. Mostly cylindrical or conical internal threads are worked into the coaxial inner walls of a socket.

A nipple is a cylindrical or bi-conical screw having on both sides a respective end face that is disposed perpendicularly in relation to the nipple axis. A nipple, for the purpose of connecting two electrodes, is screwed, for example, halfway into respective sockets of adjacent electrodes.

A preset is of an electrode and a nipple that is screwed halfway into a socket of the electrode.

Some electrodes only have a socket on one face and on the other face have an outwardly pointing coaxial thread. Such an outwardly pointing coaxial thread is referred to as an integrated nipple.

Not only do an electrode and a nipple have end faces, the integrated nipple also has an outer end face disposed perpendicularly in relation to the nipple axis.

The contact surfaces of adjacent elements are to be understood as contact surfaces that are pressed together as a result of screwing the elements together.

Ideally formed contact surfaces are such curved or planar surfaces that are not disturbed by elevations or depressions.

If asymmetrical, scale-like elevations are disposed in the same direction on an ideally formed contact surface, the totality of this is called the directional surface structure.

If a contact surface in a column of carbon electrodes has a directional surface structure, the direction in which the contact surface is used is not insignificant. In a first case, the directional surface structure can be run through from the shallow rise to the steep rise of the flanks of the scale-like elevations; in a second case, the directional surface structure can be run through from the steep rise to the shallow rise of the flanks of the scale-like elevations.

In the first case—taking into account expedient marginal conditions given the claimed low heights of the scale-like elevations—the resistance to a movement over the directional surface structure is lower than in the second case. A movement that runs substantially perpendicularly in relation to the two first-mentioned movements over the directional surface structure is not needed for these considerations. It is now advantageous to orientate the directional surface structure in the case of right-hand screws such that, with a right-hand turn (fastening of the screwed connection), the directional surface structure is run through from the shallow rise to the steep rise of the flanks of the scale-like elevations, this corresponding to the above-mentioned first case—with low resistance. Such an orientation of the surface structure is referred to as the fastening direction with this screwing movement.

If the right-hand screw with a surface structure that is aligned in the same way is turned to the left (loosening of the screwed connection), this corresponding to the above-mentioned second case—with high resistance—the direction of this screwing movement is referred to as the loosening direction.

The scale-like elevations have a substantially radially orientated comb—in relation to the longitudinal axes of the mostly cylindrical elements of an electrode column.

The comb length of a scale-like elevation is defined by the projection of the usually irregular comb on a radial line issuing from the longitudinal axis of the mostly cylindrical elements of an electrode column.

Usually carbon electrodes with carbon nipples are screwed together to form an electrode column, with the electrodes having a socket on both faces. Not all the electrodes have sockets, coaxially disposed on both faces, with internal threads. On the contrary, there are electrodes that only have such a socket on one face and have an integrated coaxial nipple on the other face. Both types of electrodes have the surface structure in accordance with the invention on the desired contact surface, with the directionally structured, scale-like elevations protruding from the ideally formed contact surfaces. The desired contact surface in the case of the usual electrode at each face is composed of one or both of the surfaces chosen from the end face of the electrode and from the threaded surfaces of the electrode socket. The latter also applies to the electrodes with just one socket. On the other face of the electrode with just one socket, the desired contact surface are of one or both of the faces chosen from the end face of the electrode and the threaded surfaces of the integrated coaxial nipple.

The contact surfaces of both adjacent elements are structured in a directional manner. The meeting directional surface structures of the contact surfaces are always orientated in opposite directions.

Reliable screwed connections or screwed connections that do not become loose again are, then, achieved if two criteria are met:

1) if the contact pressure of adjacent contact surfaces lies in the range of 0.1 to 80 $N/mm^2$; and
2) if the directionally structured, scale-like elevations over the ideally formed contact surface protrude over a small height range of three to a hundred micrometers.

It was not obvious to expect substantially improved security against loosening from the small, scale-like elevations in the state in which the elements of a column are screwed together. It has been shown that the small, scale-like elevations also withstand the mechanical loads of-the vibrations.

The specifications German Published, Non-Prosecuted Patent Application DE 41 37 020 and International Application WO 92/14939 describe, in the prior art, bumps that are only on planar functional surfaces of the fastening elements. On account of the greater ease of producing regularly configured bumps, this kind of formation of bumps is apparent. The directionally structured, scale-like elevations in accordance with the invention, however, are so small that they are provided both on planar surfaces, such as electrode faces, and on curved surfaces, such as, for example, the threads of the nipples.

In the case of Velcro-type fasteners, as a rule, the actual fastener is of a different material from that of the portions that are to be connected together. If the directionally structured, scale-like elevations in the case of a column of carbon electrodes were to be made from a different material from that of the electrodes themselves, there would be a problem when selecting the material that could scarcely be overcome. Most materials would not withstand the thermal loading when an electrode column thus joined is applied and the column would fall apart during the operation of an arc furnace. An important development of the idea in accordance with the invention is, therefore, that the scale-like elevations on the directionally structured contact surfaces of the electrode column are type-specific material of the elements of the column.

The scale-like elevations have a substantially asymmetrical shape characterized by a flank rise of differing steepness. The asymmetry is expressed by the fact that the flanks of the scale-like elevations have a substantially shallow rise in the fastening direction of the screwed connection and have a substantially steep rise in the opposite loosening direction of the screwed connection. With such a configuration of the scales, better security against loosening is achieved than with symmetrically shaped scales.

Restriction of the orientation of the scales and, thus, improvement of the security against loosening are achieved, in that the greatest heights of the scale-like elevations are formed as points or as substantially radially orientated combs or ridges relative to the-longitudinal axes of the mostly cylindrical elements of an electrode column.

If the asymmetrical scales were to be distributed in different directions on the ideally formed contact surface, the loosening action would be similar to that in the case of symmetrically shaped scales. To achieve improved security against loosening, all the asymmetrical scales are disposed in the same direction. In accordance with the invention, each shallow rise of all the scale-like elevations is disposed in the fastening direction in a contact surface—of an element of an electrode column.

The security against loosening of the connection of an electrode column will not be successful with a few of the small, asymmetrical, type-specific scale-like elevations. To achieve security against loosening that is useful technically, considerable quantities of scales are to be disposed on the contact surfaces. The following numbers can be mentioned: from the respectively ideally formed contact surfaces there protrude at least 100 meters of comb length of the scale-like elevations per square meter of contact surface, preferably, 300 meters of comb length of the scale-like elevations per square meter of contact surface. This quantity of scale-like elevations is either statistically distributed over the respective surface or, else, it covers the surface just partially or in patterns.

The success of the security against loosening is best when the resistance to a movement over the directionally structured contact surface is greatest. This also applies when two structured contact surfaces cooperate as in the case of a screw. In the case of a right-hand screw, the resistance to loosening is highest in accordance with the invention when there is a turn to the left, that is, when there is a turn in the loosening direction. The pre-condition for this is that the similar tangential directions—here the loosening direction of the screwed connection—of the two directionally structured contact surfaces of two adjacent elements of an electrode column are respectively aligned in opposite directions.

The various possibilities of developing the invention permit there to be a spread of detectable loosening torques for a screwed connection of electrode columns with two similar tangential directions, in accordance with the invention and aligned in opposite directions, of the directionally structured contact surfaces. Important variable parameters are the height of the scale-like elevations, the angles of the rises at the flanks of the scales, the widths of the scales, and the quantity and distribution of the scales. With use of these parameters, in the case of a contact pressure in the range of 0.1 to 80 $N/mm^2$ of the adjacent elements of an electrode column that are screwed together, in accordance with the invention at least 20% greater loosening torques are established than in the case of adjacent elements of an electrode column that are provided with contact surfaces that are not directionally structured and that are screwed together with a contact pressure in the range of 0.1 to 80 $N/mm^2$. This improvement in the loosening torques of mostly machine-screwed connections is even surpassed by the loosening torques of manually screwed connections of elements of an electrode column. Such connections are characterized by comparatively low contact pressures of 0.1 to 2 $N/mm^2$ of adjacent elements of an electrode column. In accordance with the invention, in the case of such connections at least 30% greater loosening torques are established than in the case of adjacent elements of an electrode column that are provided with contact surfaces that are not directionally structured and that are screwed together with a contact pressure in the range of 0.1 to 2 N/mm2.

A delivery form that is advantageous for the electrode-user, in most cases an electric steel works, is the preset. The contact surface of the preset is constructed with a directional surface structure by the electrode manufacturer, and the electrode and the nipple are screwed together. In such a connection, the directional surface structure is provided on the threaded surfaces of the electrode socket and on the threaded surfaces of the nipple; in special cases, it is just provided either on the threaded surfaces of the electrode socket or on the threaded surfaces of the nipple.

If a preset is used in the arc furnace, the preset in accordance with the invention also has a directional surface structure with orientation in the opposite direction on one or more of the contact surfaces for the next preset or for the next portion of the electrode column. In such a connection, the preset has, on the one face, a contact surface that are of one or both of the surfaces from the end face of the electrode and from the threaded surfaces of the electrode socket and, on the other face, the preset has a contact surface that are of one or both of the surfaces from the end face of the electrode and the threaded surfaces of the nipple.

Up until now, it has only been possible to limit the risk of loosening in the case of manually screwed connections by additional outlay, in part by subsequent securing measures at the steel works; the construction in accordance with the invention is already expediently integrated into the manu-facturing process.

Two graphite electrodes with diameters of in each case 600 mm were screwed together with a fitting nipple to form an electrode column on a screwing stand ex Piccardi (Dalmine(Bergamo)/Italy) called a "Nipplingstation", year of construction 1997. A preset of an electrode and a nipple already pre-screwed into a socket of the electrode was used in the connection. The preset and electrode were screwed together. When a tightening torque of 4,000 Nm was reached, the screwing was terminated.

To characterize the security of the unity of the screwing, the connection was undone again subsequently and the loosening torque measured.

This basic procedure was carried out in three variants A, B, and C.

Variant A:

The contact surfaces of the preset and the electrode were not given a directional structure of the contact surfaces in accordance with the invention and were screwed together as a reference system.

Variant B:

A preset and an individual electrode having the structure of the contact surfaces that is in accordance with the invention and orientated in opposite directions were screwed together. The end faces of the electrodes were chosen as the contact surfaces.

Variant C:

The contact surfaces of the preset and of the individual electrode were provided with a sliding layer. The sliding layer was of the bearing grease having the type designation arcanol 12V ex FAG Kugelfischer (Schweinfurt/Germany). The end face of the electrode and the free threaded surfaces of the nipple were selected as the contact surfaces. The thickness of the sliding layer amounted to 0.1 mm.

TABLE 1

| | Measure | Modified surfaces | Loosening torque [Nm] |
|---|---|---|---|
| Variant A | Without sliding agent, without directional structure of the contact surfaces | None | 6,000 |
| Variant B | With directional structure of the contact surfaces | End faces of the electrodes | 9,000 |
| Variant C | With sliding agent (0.1 mm bearing grease arcanol 12 V) | End face of electrode and threaded surfaces of nipple | >12,000 |

The values specified in Table 1 hold true for electrodes having a diameter of 600 mm and for a tightening torque of 4,000 Nm during screwing.

As follows from the table, the loosening torque was dependent upon the type of surface construction or treatment. The lowest loosening torque was achieved in the case of contact surfaces without special measures (Variant A). In the case of end faces with an oppositely orientated structure of the contact surfaces of the elements that are screwed together very high loosening torques were measured.

While Variant C results in an even higher loosening torque than Variant B, the result is only possible with the aid of additional treatment. In contrast, in the case of Variant B, the favorable loosening torque is achieved without additional treatment.

Other features that are considered as characteristic for the invention are set forth in the appended claims.

Although the invention is illustrated and described herein as embodied in a carbon electrodes and their connection elements having directionally structured contact surfaces, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
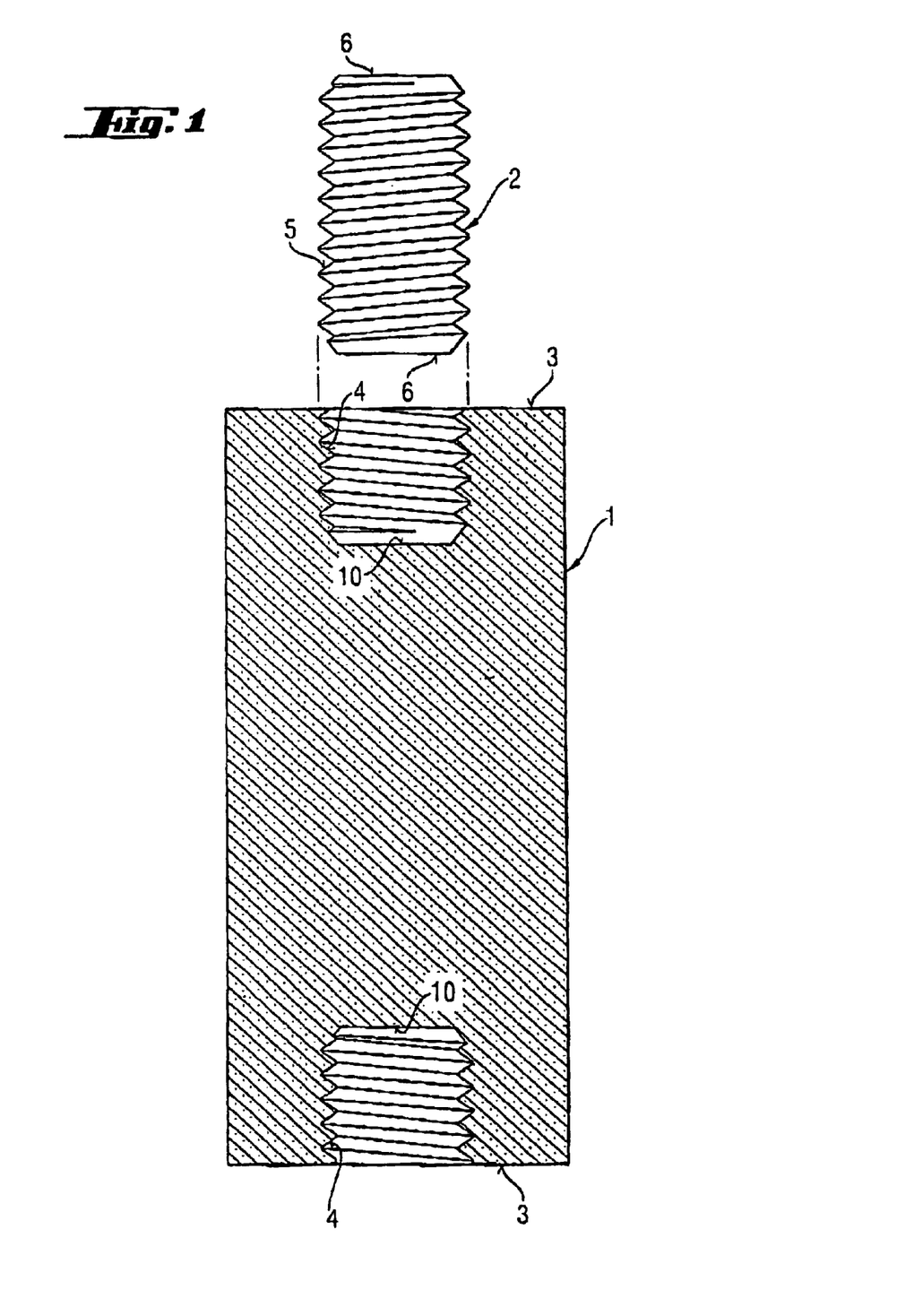
FIG. 1 is a cross-sectional view parallel to a longitudinal axis through an electrode according to the invention with sockets introduced into end faces thereof on both ends and having respective cylindrical internal threads, and through a longitudinal side of an independent nipple 2 according to the invention with a cylindrical thread.

Referring now to the figures of the drawings in detail and first, particularly to FIG. 1 thereof, there is shown an electrode 1 according to the invention. The following comments are made with respect to the contact surfaces of the electrodes 1.

The end face 3 of the electrode 1 and threaded surfaces 4 of the coaxially disposed electrode socket.

The socket base 10 of the electrode is not a contact surface.

As contact surfaces in the case of an independent nipple 2 there are the threaded surfaces 5 of the nipple 2.

The end faces 6 on both sides of the nipple 2 are not contact surfaces.

Figure 2:
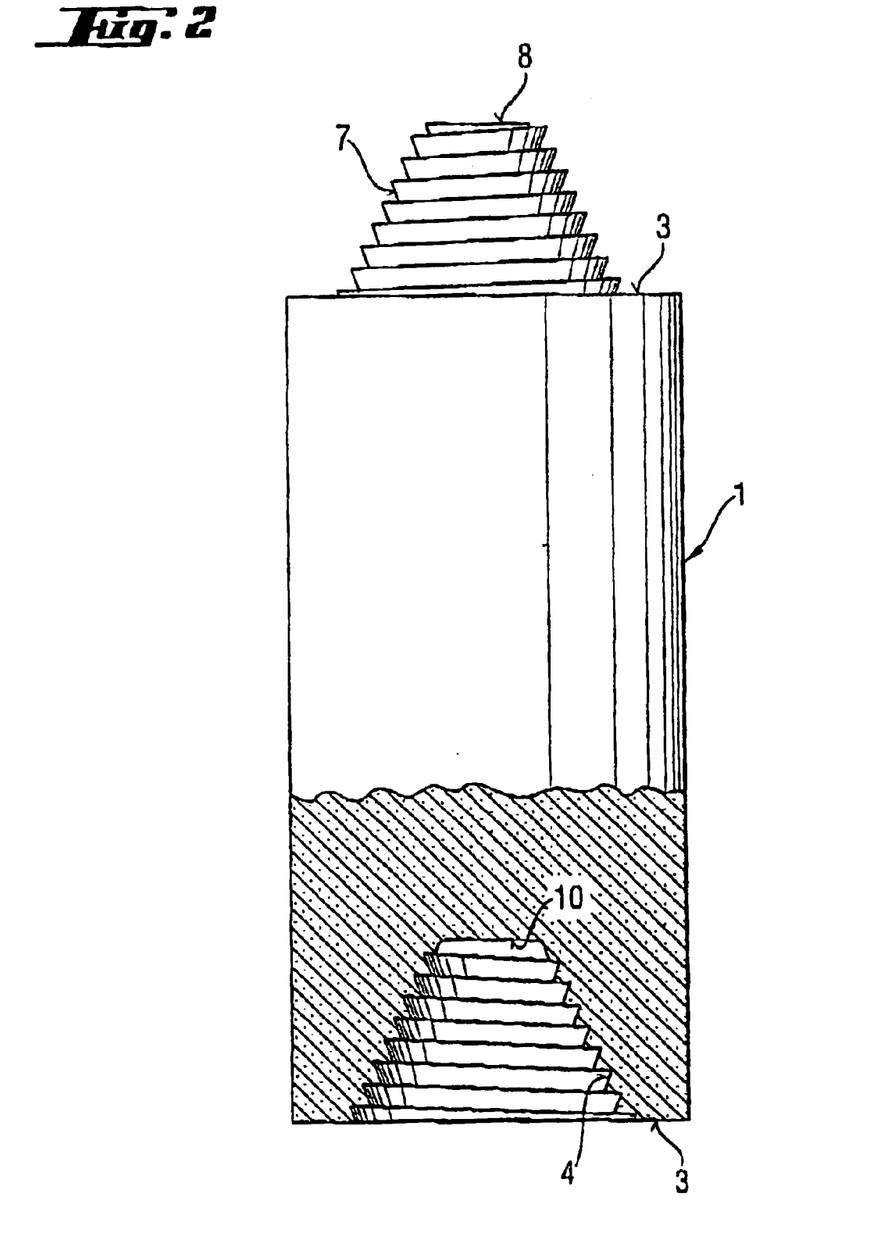
FIG. 2 is a side elevational view of a longitudinal side of an electrode according to the invention with an integrated coaxial nipple that is pre-formed on one face and, on the other face, is a broken away cross-sectional view parallel to the longitudinal axis with a socket having a conical internal thread.

In FIG. 2, the contact surfaces of the electrodes 1 that have integrated nipples include the end face 3 of the electrode 1 and the threaded surfaces 7 of the integrated coaxial nipple and also, on the other face of the electrode 1, the electrode's 1 end face 3 and threaded surfaces 4 of the socket.

The outer end face 8 of the integrated coaxial nipple is not a contact surface that is to be provided with a sliding layer. The socket base 10 of the electrode is not a contact surface.

Figure 3:
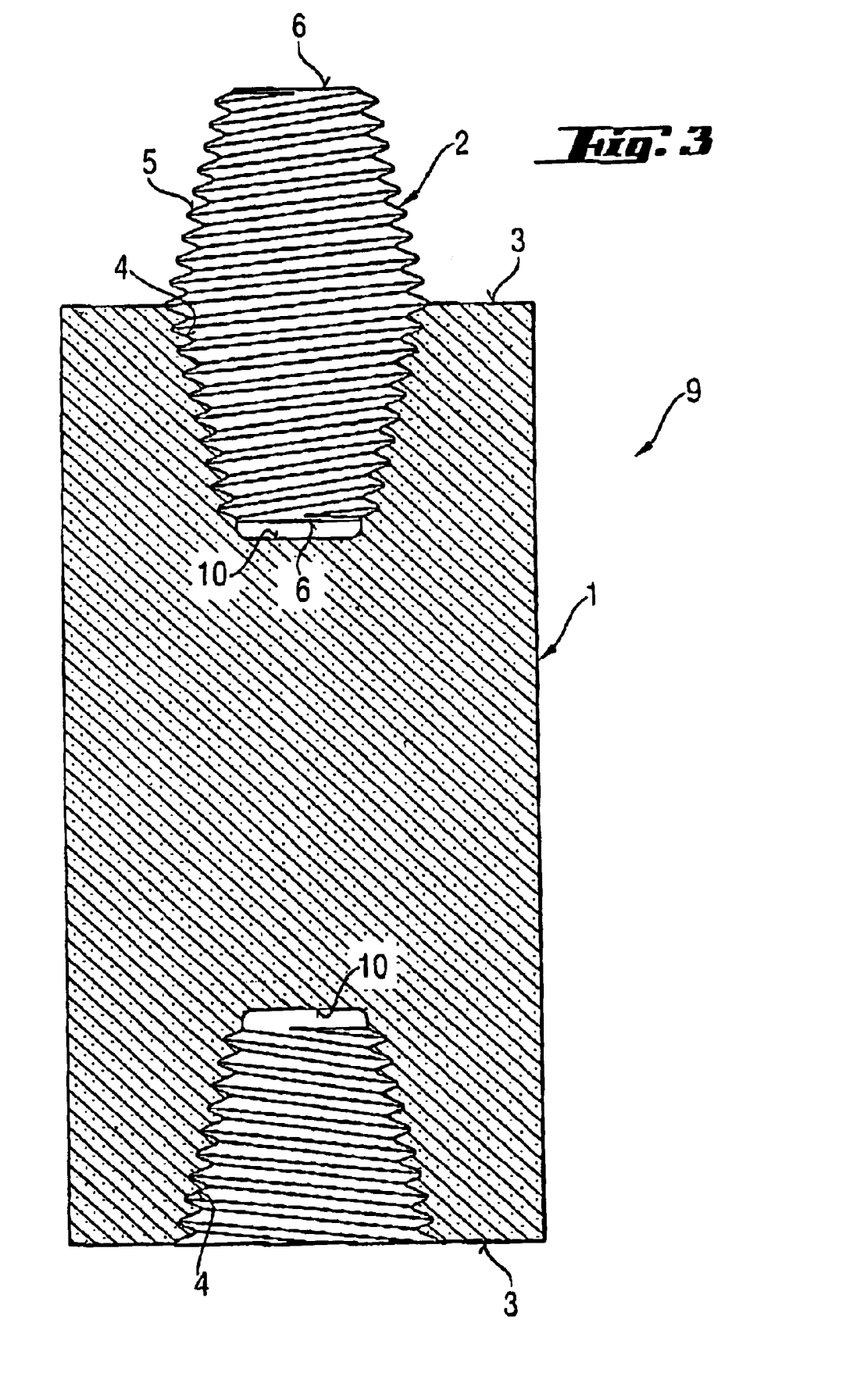
FIG. 3 is a cross-sectional view of a preset composed of an electrode with conical sockets and a nipple with a bi-conical thread according to the invention parallel to the longitudinal axis of the preset.

In FIG. 3, the inner contact surfaces of the preset 9 include the threaded surfaces 4 of the coaxially disposed electrode socket and the threaded surfaces 5 of the independent nipple 2. The end faces 6 of the nipple 2 are not contact surfaces.

On the side of the screwed-in nipple 2, the outer contact surfaces of the preset 9 include the threaded surfaces 5 of the independent nipple 2 and also the end face 3 of the electrode 1. The end faces 6 of the nipple 2 are not contact surfaces.

On the side in FIG. 3 without the screwed-in nipple, the outer contact surfaces of the preset 9 include the end face 3 of the electrode 1 and the threaded surfaces 4 of the coaxially disposed electrode socket. The socket base 10 of the electrode is not a contact surface.

Figure 4:
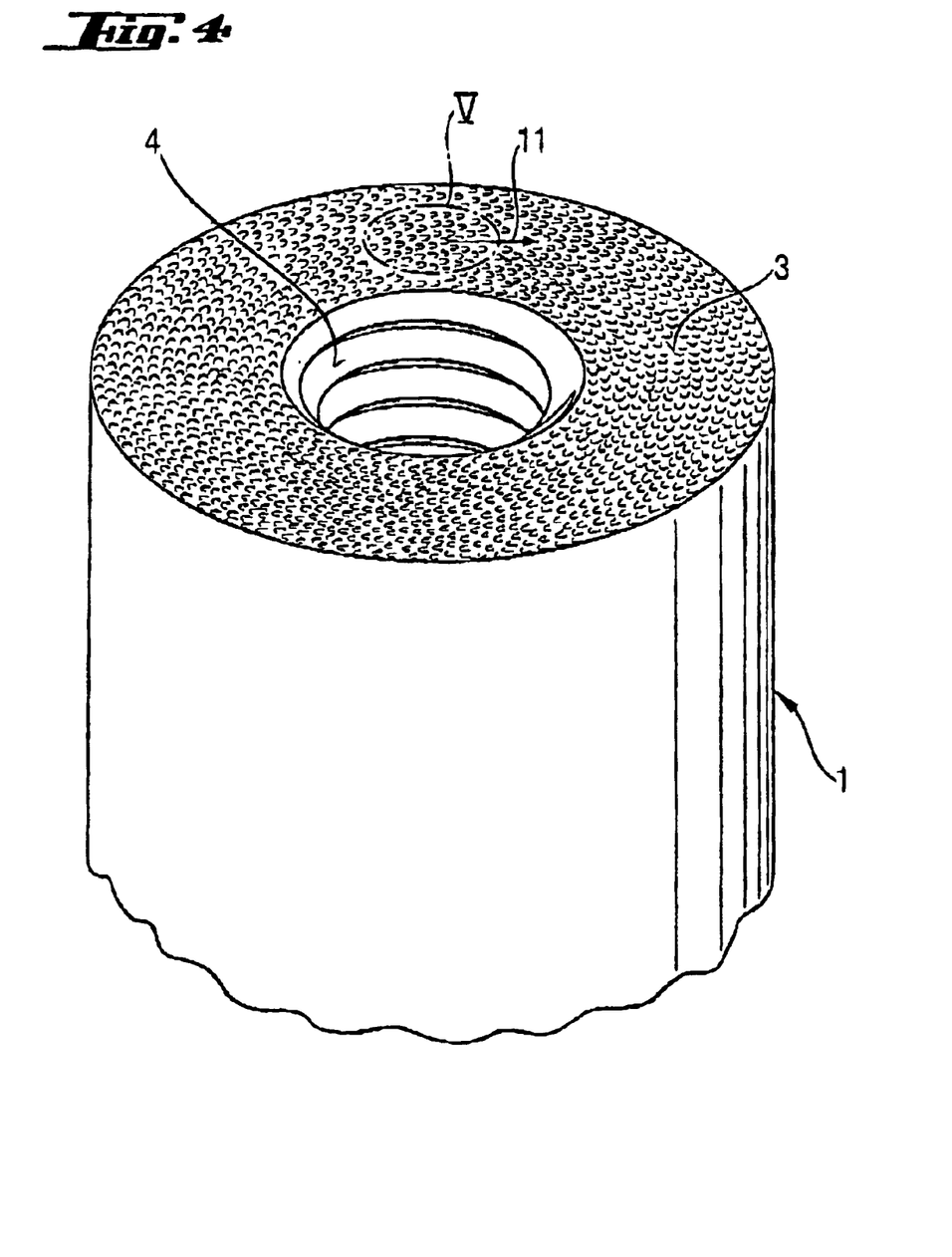
FIG. 4 is a fragmentary, perspective view of an end face of an electrode according to the invention with a directionally structured contact surface.

In FIG. 4, the electrode 1 has a directionally structured contact surface on the planar end face 3. The individual asymmetrical scale-like elevations have a preferred orientation that corresponds to the fastening direction 11 for right-hand screws (of course, the orientation can be opposite to the fastening direction 11 for left-hand screws). The fastening direction 11 is to be understood such that the electrode 1 that is shown in FIG. 1 and a nipple screwed therein are fixed. A further electrode, which is not shown in the drawing, is screwed on from above. The further electrode is turned when fastening in the direction of the arrow 11. This process corresponds to that in the steel works. The surface structure of the area V from FIG. 4 is shown on an enlarged scale in FIG. 5.

Figure 5:
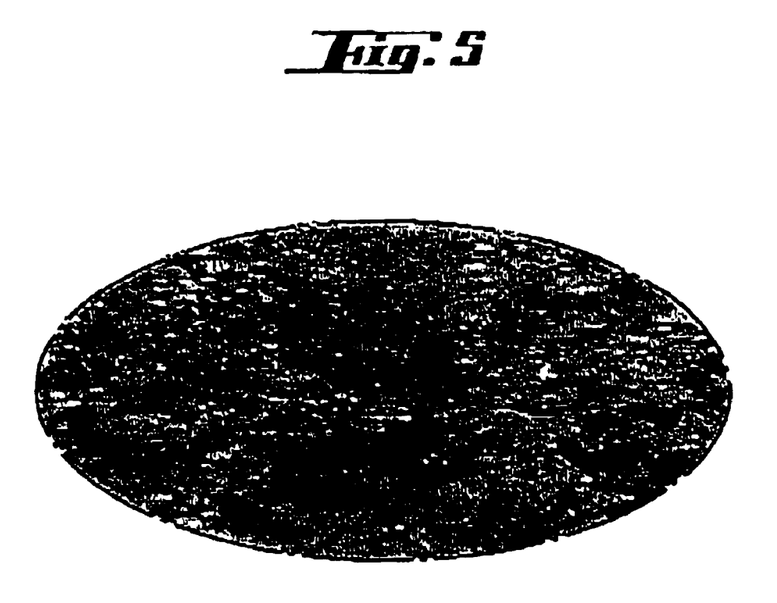
FIG. 5 is a fragmentary, enlarged, diagrammatic perspective view of the portion V of the directionally structured electrode end face (contact surface) of FIG. 4.

FIG. 5 shows the partial enlargement of the area V from the contact surface 3 of the electrode 1 from FIG. 4. The model representation of the directionally structured electrode end face is shown.

We claim:

1. An electrode column for use in an arc furnace for the production of high-melting-point metals, comprising:

carbon electrodes having:

end faces; and sockets having internal threads, said sockets being disposed at said end faces;

carbon nipples connecting two respective ones of said electrodes at said sockets;

said carbon electrodes and said carbon nipples having ideally formed contact surfaces with directionally structured, scale-shaped elevations protruding therefrom over a height range between three micrometers and one hundred micrometers; and adjacent ones of said contact surfaces of a screwed together connection of said electrodes having a contact pressure in a range between 0.1 N/mm$^2$ and 80 N/mm$^2$.

2. The column according to claim 1, wherein said ideally formed contact surfaces are one of planar and curved.

3. The column according to claim 1, wherein:

said carbon electrodes and carbon nipples are of a material; and said elevations on said contact surfaces are of said material.

4. The column according to claim 1, wherein:

said screwed connection has a fastening direction and an loosening direction opposite said fastening direction;

said elevations have a substantially asymmetrical shape with flanks having a flank rise of differing steepness; and said flanks have a substantially shallow rise in said fastening direction and have a substantially steep rise in said loosening direction.

5. The column according to claim 1, wherein:

said electrodes are substantially cylindrical with a longitudinal axis; and said elevations have a greatest height formed as a point or as a substantially radially orientated comb relative to said longitudinal axis.

6. The column according to claim 1, wherein:

said electrodes are substantially cylindrical with a longitudinal axis; and said elevations have, relative to said longitudinal axis, a greatest height formed as a point or as a substantially radially orientated comb.

7. The column according to claim 4, wherein each said shallow rise of all said elevations is disposed in said fastening direction in said contact surfaces.

8. The column according to claim 1, wherein said elevations are statistically distributed over a respective contact surface.

9. The column according to claim 1, wherein said elevations are disposed:

to partially cover a respective ideally formed contact surface; or in at least one pattern.

10. The column according to claim 1, wherein a respective contact surface contain at least 100 meters of comb length of said elevations per square meter of said contact surface.

11. The column according to claim 1, wherein a respective contact surface contain at least 300 meters of comb length of said elevations per square meter of said contact surface.

12. The column according to claim 1, wherein:
said screwed connection has a fastening direction and an loosening direction opposite said fastening direction;
said carbon electrodes and said carbon nipples are elements of an electrode column; and
similar tangential directions selected from at least one of the group consisting of said fastening direction and said loosening direction of said contact surfaces of two adjacent ones of said elements are respectively aligned in opposite directions.

13. The column according to claim 1, wherein:
one of said carbon electrodes and one of said carbon nipples are combined to form a preset with inner contact surfaces;
said electrode eletrode socket and said nipple have threaded surfaces; and
said inner contact surfaces of said preset are directionally structured and include said threaded surfaces of said electrode eletrode socket and said nipple.

14. The column according to claim 1, wherein said end faces, said sockets and said nipples have said contact surfaces with said elevations.

15. An electrode column for use in an arc furnace for the production of high-melting-point metals, comprising:
carbon electrodes each having:
end faces;
a socket with an internal thread on one of said end faces; and
an integrated nipple on another of said end faces;
said carbon electrodes having ideally formed contact surfaces with directionally structured, scale-shaped elevations protruding therefrom over a height range between three micrometers and one hundred micrometers; and
adjacent ones of said contact surfaces of a screwed together connection of said electrodes having a contact pressure in a range between 0.1 N/mm$^2$ and 80 N/mm$^2$.

16. The column according to claim 15, wherein said ideally formed contact surfaces are one of planar and curved.

17. The column according to claim 15, wherein:
said carbon electrodes are of a material; and
said elevations on said directionally structured contact surfaces are of said material.

18. The column according to claim 15, wherein:
said screwed connection has a fastening direction and an loosening direction opposite said fastening direction;
said elevations have a substantially asymmetrical shape with flanks having a flank rise of differing steepness; and
said flanks have a substantially shallow rise in said fastening direction and have a substantially steep rise in said loosening direction.

19. The column according to claim 15, wherein:
said electrodes are substantially cylindrical with a longitudinal axis; and
said elevations have a greatest height formed as a point or as a substantially radially orientated comb relative to said longitudinal axis.

20. The column according to claim 15, wherein:
said electrodes are substantially cylindrical with a longitudinal axis; and
said elevations have, relative to said longitudinal axis, a greatest height formed as a point or as a substantially radially orientated comb.

21. The column according to claim 18, wherein each said shallow rise of all said elevations is disposed in said fastening direction in said contact surfaces.

22. The column according to claim 15, wherein said elevations are statistically distributed over a respective contact surface.

23. The column according to claim 15, wherein said elevations are disposed one of:
to partially cover a respective ideally formed contact surface; and
in at least one pattern.

24. The column according to claim 15, wherein a respective contact surface contain at least 100 meters of comb length of said elevations per square meter of said contact surface.

25. The column according to claim 15, wherein a respective contact surface contain at least 300 meters of comb length of said elevations per square meter of said contact surface.

26. The column according to claim 15, wherein:
said screwed connection has a fastening direction and an loosening direction opposite said fastening direction; and
similar tangential directions selected from at least one of the group consisting of said fastening direction and said loosening direction of said contact surfaces of two adjacent ones of said carbon electrodes are respectively aligned in opposite directions.

27. The column according to claim 15, wherein:
one of said carbon electrodes forms a preset with inner contact surfaces;
said socket and said nipple have threaded surfaces; and
said inner contact surfaces of said preset are directionally structured and include said threaded surfaces of said socket and of said nipple.

28. The column according to claim 15, wherein said end faces, said socket, and said nipple have said contact surfaces with said elevations.

29. In an arc furnace for the production of high-melting-point metals, an electrode column comprising:
carbon electrodes having:
end faces; and
sockets having internal threads, said sockets being disposed at said end faces;
carbon nipples connecting two respective ones of said electrodes at said sockets; and
said carbon electrodes and said carbon nipples having ideally formed contact surfaces with directionally structured, scale-shaped elevations protruding therefrom over a height range between three micrometers and one hundred micrometers; and
adjacent ones of said contact surfaces of a screwed together connection of said electrodes having a contact pressure in a range between 0.1 N/mm$^2$ and 80 N/mm$^2$.

30. The column according to claim 29, wherein said end faces, said sockets and said nipples have said contact surfaces with said elevations.

31. In an arc furnace for the production of high-melting-point metals, an electrode column comprising:
carbon electrodes each having:
end faces;
a socket with an internal thread on one of said end faces; and
an integrated nipple on another of said end faces; and said carbon electrodes having ideally formed contact surfaces with directionally structured, scale-shaped elevations protruding therefrom over a height range between approximately three micrometers and approximately one hundred micrometers;

adjacent ones of said contact surfaces of a screwed together connection of said electrodes having a contact pressure in a range between approximately 0.1 N/mm$^2$ and approximately 80 N/mm$^2$.

32. The column according to claim 31, wherein said end faces, said socket and said nipple have said contact surfaces with said elevations.

* * * * *